United States Patent [19]
Kaiser et al.

[11] Patent Number: 5,870,031
[45] Date of Patent: Feb. 9, 1999

[54] FULL-WAVE RECTIFIER AND METHOD OF OPERATION FOR A RECOGNITION SYSTEM

[75] Inventors: Ulrich Kaiser, Warstein; Harald Parzhuber, Eching, both of Germany

[73] Assignee: Texas Instruments Incorporated, Dallas, Tex.

[21] Appl. No.: 792,643

[22] Filed: Jan. 31, 1997

[51] Int. Cl.[6] .............................. H04Q 5/22; H02M 1/20; H04L 13/10; H03K 5/00

[52] U.S. Cl. .................. 340/825.54; 363/127; 363/89; 327/494; 327/303; 327/104; 307/261

[58] Field of Search ....................... 327/303, 104, 327/306, 538, 535, 540, 563, 62, 72, 73, 58, 91, 494; 363/127, 21, 89; 322/28; 323/268, 282, 285; 326/84; 329/369; 342/44, 51, 42; 340/825.31, 825.54

[56] References Cited

U.S. PATENT DOCUMENTS

| | | |
|---|---|---|
| 3,299,424 | 1/1967 | Vinding . |
| 3,689,885 | 9/1972 | Kaplan et al. .......................... 340/152 |
| 3,752,960 | 8/1973 | Walton .................................. 235/61.11 |
| 3,859,624 | 1/1975 | Kriofsky et al. ..................... 340/152 |
| 3,898,619 | 8/1975 | Carsten et al. ....................... 340/152 |
| 4,333,072 | 6/1982 | Beigel . |
| 4,730,188 | 3/1988 | Milheiser ............................... 340/825 |
| 4,875,151 | 10/1989 | Ellsworth et al. ..................... 363/127 |
| 4,941,080 | 7/1990 | Sieborger .............................. 363/127 |
| 5,041,826 | 8/1991 | Milheiser ........................ 340/825.54 |
| 5,396,251 | 3/1995 | Schuermann ........................... 342/51 |
| 5,461,386 | 10/1995 | Knebelkamp ........................... 342/44 |

*Primary Examiner*—Michael Horabik
*Assistant Examiner*—Jean B. Jeanglaude
*Attorney, Agent, or Firm*—Rebecca Mapstone Lake; Richard L. Donaldson

[57] ABSTRACT

A full-wave rectifier circuit (70) includes a first transistor (N1) and a second transistor (N2) in combination to form a first transistor pair (N1 and N2) for minimizing the voltage drop between ground (88) and the transponder substrates. A third transistor (P1) and a fourth transistor (P2) operate in combination to form a second transistor pair (P1 and P2) for minimizing the voltage drop between the alternating current peak voltage (118 and 120) and the output voltage ($V_{DD}$) of the full-wave rectifier (70). The first transistor pair (N1 and N2) and second transistor pair (P1 and P2) are controlled by alternating current voltage input signals (118 and 120). A series regulator circuit (70) decouples the first transistor pair (N1 and N2) and the second transistor pair (P1 and P2) from capacitive loads (C1 and C2) of the full-duplex transponder circuitry (14).

8 Claims, 3 Drawing Sheets

FULL-WAVE RECTIFIER AND METHOD OF OPERATION FOR A RECOGNITION SYSTEM

TECHNICAL FIELD OF THE INVENTION

The present invention relates to an improved full-wave rectifier for a recognition system, and, more particularly, to an improved full-wave rectifier for a recognition system, which system is usable in conjunction with an ignition switch or similar control mechanism for a vehicle or other facility, and which full-wave rectifier provides a maximum DC voltage for a full-duplex transponder and increases the ability of the system to recognize and respond to a key, or similar item, which "matches" the ignition system or other control mechanism.

BACKGROUND OF THE INVENTION

Various types of recognition systems are taught by the following commonly assigned U.S. Patents and Applications: U.S. Pat. Nos. 5,287,112; 5,270,717; 5,196,735; 5,170,493; 5,168,282; 5,126,745; 5,073,781; 5,053,774; 5,025,492; U.S. Ser. No. 08/021,123, filed Feb. 23, 1993 [TI-17529]; Ser. No. 08/065,286, filed May 21, 1993 [TI-16981]; and Ser. No. 08/086,786, filed Jul. 2, 1993 [TI-17507]. Systems conforming to the teachings of the foregoing documents are marketed under the name TIRIS ("Texas Instruments Register and Identification System"). A recognition system similar in result to, but structurally and functionally specifically different from, TIRIS is disclosed in U.S. Pat. No. 4,918,955. Other types of recognition systems include systems known as AVI (for "Automatic Vehicular Identification"), as taught, for example, by commonly assigned U.S. Pat. No. 5,287,112 and commonly assigned U.S. application Ser. No. 08/021,123, filed Feb. 23, 1993.

In one type of TIRIS recognition system of interest, a transmitter/receiver (also referred to herein, in the claims hereof and elsewhere as an "interrogator" or a "reader") selectively radiates energy via an associated first antenna. The energy is radiated from the vicinity of a key-operated lock, such as a vehicle ignition switch. The radiated energy is often referred to as an "interrogation signal." The radiated energy is received by a second antenna present on or in a key. The key also includes facilities, such as circuitry (sometimes called a "transponder" or "tag"), connected to the second antenna. An electrical signal produced or induced in the key's circuitry by the received energy either is affected (e.g., increased or decreased) by the circuitry or effects the generation of a stored, uniquely coded signal by the circuitry. The affected or coded signal is often referred to as a "recognition signal."

Depending on the constituents of the key's circuitry, either the recognition signal is transmitted or reflected back to the transmitter/receiver via the second and first inductors or antennas. A key "matching" the particular ignition switch transmits or causes a predetermined recognition signal. Other keys which operate other ignition switches associated with similar recognition systems may similarly respond to the interrogation signal but transmit recognition signals different from the predetermined recognition signal.

The transmitter/receiver includes facilities which analyze the recognition signals received thereat to determine if the analyzed signal is the predetermined recognition signal produced by the matching key. If the analyzed signal is the predetermined recognition signal, the concurrence of such predetermined recognition signal and the operation of the ignition switch by the matching key starts the engine of the vehicle. If the analyzed signal is not the predetermined recognition signal, either the ignition switch cannot be operated by the key, or, if it can be operated, such operation is ineffective to start the engine.

Portability and/or space limitations usually result in the transmitter/receiver of a TIRIS-type of recognition system being not very powerful. Also, the recognition signals, that is the signals transmitted or reflected back to the transmitter/receiver from the key-included circuitry, may be derived from the limited energy radiated from the transmitter/receiver, not from energy derived from a key-contained power source, such as a battery, as is typical in systems of the AVI type. While the use of a battery with key-included circuitry of a TIRIS system is technically possible, the large size and resulting unwieldiness of the resulting key would probably lead to rejection by users. As a consequence of the foregoing, it is critical that circuit efficiencies be as high as possible.

One type of recognition circuitry of the subject type includes active and passive components, which in response to the receipt of energy from the transmitter/receiver produce a coded signal. See the above-noted commonly assigned U.S. Patents and Applications. The coded signal, which may be produced by data stored in memory, is transmitted back to the transmitter/receiver, where comparison with the stored "matching" signal is carried out. The coded signal may be produced by modulating a carrier with the stored code, and the carrier may be, or may be derived from, the energy received by the key-included facilities from the transmitter/receiver. In this latter event, the system may be of the TIRIS variety, and the key and its circuitry require no on-board power source and may be said to be "batteryless." This third type of system may also be of the AVI variety, in which case the transponder is typically powered by a self-contained power source.

Recognition systems of the above type may be the full-duplex variety. Specifically, the transmitter/receiver may simultaneously operate as both a transmitter and a receiver, that is, it may simultaneously radiate energy to the key-included circuitry and receive for analysis the corresponding signal produced by such circuitry. Typically, in full-duplex operation, the frequency of the modulated carrier radiated by the transmitter/receiver to the key-included circuitry is different from the frequency of the modulated carrier produced by the key-included circuitry and thereafter received and analyzed by the receiver/transmitter. See above-noted commonly assigned application Ser. No. 08/012,123 [TI-17529].

Available full-duplex transponders contain full-wave rectifiers that provide the circuits on a single silicon chip with a DC voltage. This voltage, which is usually in the order of 2 volts, is on the order of 0.7 to 1.5 volts lower than the maximum alternating current peak voltage at the input of the rectifier. This voltage drop has its problems in long-range operations, because the available alternating current voltage, by the time it reaches its destination, is much lower than desirable.

Conventional rectifiers circuits for full-duplex transponders include circuitry that transmits radiofrequency energy from a reader unit to the transponder via the electromagnetic coupling of the two antennas. In such a circuit, the sinewave alternating current voltage between the two coils is reflected in order to generate, using a full-wave rectifier circuit, a direct current voltage $V_{DD}$. The conventional rectifier circuits include four diodes that are associated to rectify the alternating current voltage. When the diodes are conducting, the coils connecting to the electromagnetic coupling are negative, typically having a value of approximately −0.6 volts. Also, the maximum value of $V_{DD}$ is smaller than the maximize voltage at the coils. As a result, it is expensive to realize diodes in an implementation of a rectifier circuit wherein the diodes are independent from the substrate, such as with a Schottky diode or n-poly/p-poly diode. In essence, there is the need for a more efficient full-duplex transponder circuit that includes a full-wave rectifier.

One attempt to include the rectifier circuit includes a network of simple diodes associated with N-channel transistors. In such a circuit, the negative halfwave of the alternating current is fed through a circuit. In order to avoid current flow in reverse direction, a P-channel transistors works as a diode. The problem with working with the P-channel transistor as a diode is that it is not possible to use this circuit with the circuit that employs EEPROM capacitive trimming. For transponder operation, this limitation is not acceptable.

In addressing the particular needs of a transponder circuit operation, four N-channel transistors have been used to form a rectifier circuit. In this circuit, and due to the active switches N1 and N2, there are nearly no negative voltage drops. There are no other diodes necessary. In addition, capacitive trimming is possible for large N-channel transistors. A disadvantage with this circuit, however, is that the voltage drop across the N-channel transistors that supply VDD can be excessive, for example, on the order of 1.6 volts. Such a circuit is described in K. Klosa, *Kontaktlose RF-indentifikationssyteme-Funktionsweise*, SCHALTUNG-STECHNIK UND REALISIERUNG DES RF-INTERFACES, GME Mikroelectronik, Dresden, Germany, 1993.

SUMMARY OF THE INVENTION

There is a need, in light of the above limitations, for a circuit and method of operation that provides maximum available $V_{DD}$ voltage for a full-duplex transponder.

There is a further need for a rectifier circuit that may be used in conjunction with the regulator circuit and a capacitive trimming circuit for a full-duplex transponder that provides greater output voltage for a given input voltage.

The foregoing disadvantages are eliminated and needs are satisfied by the improved full-wave rectifier of the present invention. The improved full-wave rectifier is used with a transponder (an "interrogator" or "reader") of a recognition system that is usable in conjunction with an ignition system or similar control mechanism for a vehicle or other facility.

Accordingly, the present invention provides a full-wave rectifier circuit providing maximum output voltage, $V_{DD}$, to a full-duplex transponder. The full-wave rectifier provides maximum voltage using two P-channel transistor switches for minimizing the voltage drop between the alternating current peak voltage and the output voltage of the rectifier, $V_{DD}$. Two N-channel transistors operate as switches to minimize the voltage drop between ground and the integrated circuit substrate. The full-wave rectifier circuit further associates with a series regulator circuit for decoupling the two P-channel switches from capacitive loads associated with the full-duplex transponder.

A technical advantage of the present invention is a rectifier circuit that may be used with a full duplex transponder in that it provides a maximum available $V_{DD}$ voltage for use by the associated regulator to produce an improved control voltage for the transponder.

Another technical advantage of the present invention is that it permits the combination of a capacitive trimming circuit with the rectifier circuit. This is because of the large N-channel transistors that conduct the alternating current. The included parasitic diodes between substrate and the drains of the N-channel transistors and those of the P-channel transistors, as well as the wells of the N-channel transistors are in a correct direction to permit coil voltages below the switching levels of the associated transistors.

In its broadest aspect, the improved full-wave rectifier maximizes the DC voltage transmitted to the associated full-wave rectifier by using two P-channel transistors that minimize the voltage drop across the full-wave rectifier.

BRIEF DESCRIPTION OF THE DRAWINGS

The invention in its mode of use and advantages are best understood by reference to the following description of illustrative embodiments when read in conjunction with the accompanying generalized, schematic drawings, wherein.

DETAILED DESCRIPTION OF THE INVENTION

Figure 1A:
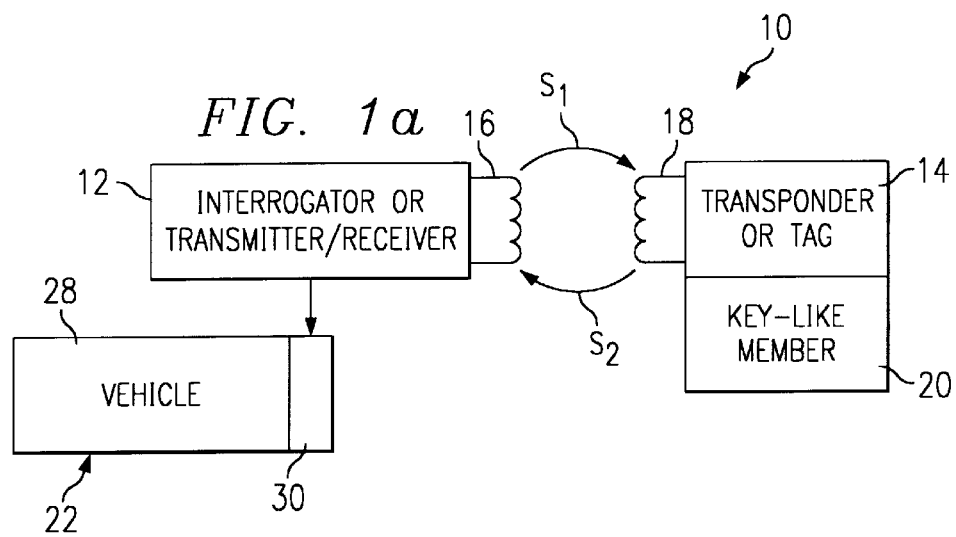
FIGS. 1a and 1b are generalized depictions of recognition systems that may employ the novel concepts of the present invention.
Figure 1B:
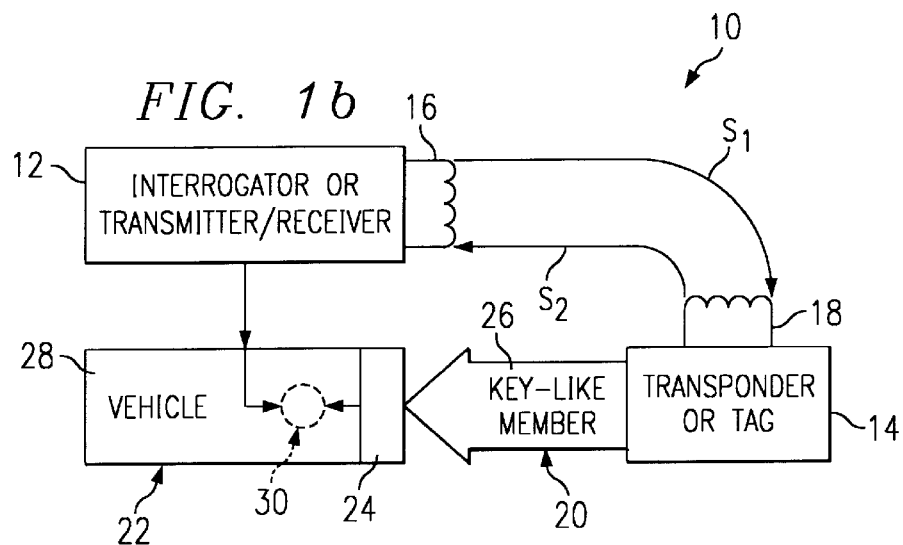

FIGS. 1a and 1b generally illustrate recognition systems 10 that may employ the novel concepts of the present invention. Referring first to FIG. 1a, such systems include transmitter/receiver 12, often called an interrogator or a reader, and transponder 14, sometimes referred to as a tag. Interrogator 12 is a portable or stationary unit which is capable of both transmitting and receiving energy via antenna 16. Transponder 14, which may be self-powered or "batteryless," is capable of receiving energy via an included antenna 18 and, as a consequence thereof, can affect transmitter receiver 12 or transmit energy thereto via antenna 18. Transponder 14 is usually portable and is typically associated with or attached to key-like member 20 which may require identification, counting, routing, sorting or the like.

In typical use, interrogator 12 transmits either continuously or selectively, interrogation signals, in the form of electromagnetic energy, such as radiofrequency (RF) energy, having predetermined characteristics. Selective operation may be initiated manually by a user who perceives the key-like member 20 and who wishes to identify, count, route or sort signals from key-like member 20. Selective operation may also be initiated by key-like member 20 being proximate to or moving past interrogator 12. Transponder 14, which associates with or mounts to key-like member 20 may either "match" or not "match" interrogator 12. If transponder 14 matches, the appropriate key-like member 20 is intended to be identified and counted, routed, sorted, or the like. If transponder 14 does not match, the appropriate key-like member is not intended to be identified, counted, routed, sorted, or the like.

A matching transponder 14 receives the interrogation signal via associated antennas 18 and return a predetermined recognition signal, that is, to either affect interrogator 12 in a predetermined fashion or transmit thereto a signal which is coded in a predetermined manner. A non-matching transponders 14 either does not react at all to the received energy or responds with other than the predetermined recognition signal. The interrogation signal and its related energy that are transmitted by the interrogator 12 and received by the transponder 14 are denoted S1. The recognition signal and its related energy, or the returned signal which produces the recognition signal in response to the interrogation signal S1, are denoted S2.

Systems 10 of the type described in the foregoing paragraphs may be of the TIRIS variety and may include transponder 14 which may be batteryless, that is, may include no on-board power supply. The circuitry of these types of transponders 14 is powered by the energy in the recognition signal S1 received from the interrogator 12 via the antennas 16, 18. In this way transponder 14 may be made extremely small. Indeed, a transponder 14 of the batteryless type may be often subcutaneously implanted in livestock for purposes of later identification or counting.

The transponders 14 of any of the above systems 10 may, at the expense of smallness in size, be powered by an on-board power source. In AVI systems 10 the transponders 14 are carried within vehicles 22. In response to interrogation signal S1 transmitted to a moving vehicle at a selected site, such as a toll booth, such transponders 14 respond with signal S2 which informs interrogator 12 of the identity of vehicle 22. This information is used, in turn, to record the fact that a toll is owed in device 22, with a bill being later sent.

In systems 10 of the AVI type, the signals S1 and S2 need to be relatively strong because of the typical high separation between the interrogator 12 and the transponder 14. In other recognition systems 10, especially those that are batteryless, the signals S1 and S2 are relatively weaker. In either event, it is desirable for transponder 14 to efficiently effect the proper transmission and reception of the signals S1 and S2.

A variation of the above system 10 is illustrated in FIG. 1b, which is similar to the system of FIG. 1a except that the device 22 is associated with a control mechanism 24 and transponder 14 is associated with key-like member 26 for control mechanism 24. In a specific example of this type of system 10, which serves as an anti-theft function, the device 22 may be vehicle 28, control mechanism 24 may be an ignition switch which includes a key-operable lock, and key-like member 26 may be a key or other operating member. Transponder 14 may be of the miniature, batteryless variety and is preferably embedded in key-like member 26. The proximity of inductor 18 of transponder 14 in key-like member 26 to antenna 16 of interrogator 12 efficiently couples antennas 16, 18 to permit the above-described transmission and reception of the signals S1 and S2.

Figure 2:
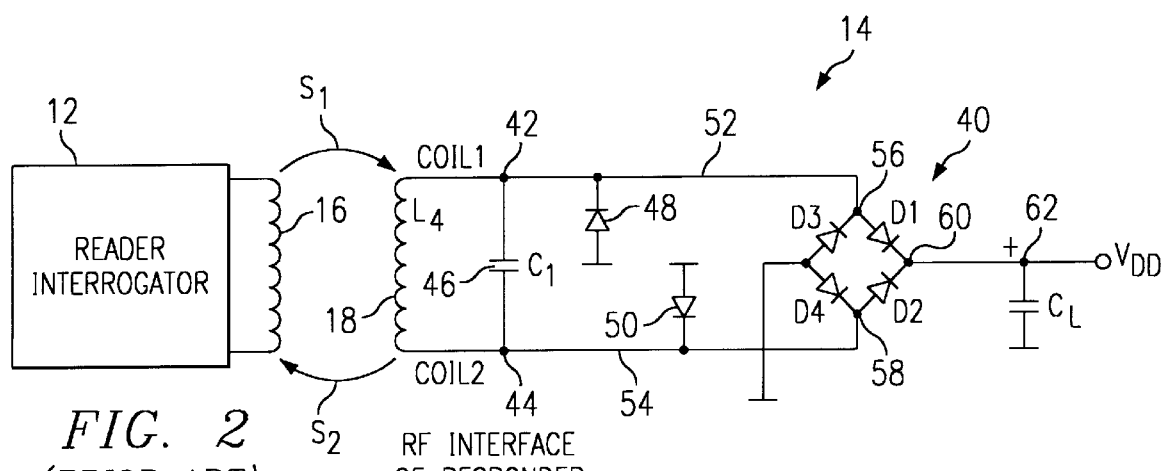
FIG. 2 illustrates the prior art configuration for transponder circuit that includes a diode-based full-wave rectifier.

FIG. 2 illustrates in further detail a circuitry part of full-duplex transponder 14 that may employ the present embodiment, showing particularly the prior art diode-based full wave rectifier circuit 40. In prior art transponder circuit 14 of FIG. 2, COIL1 connects to antenna 18 and to node 42. COIL2 also connects to antenna 18, as well as to node 44. Capacitor 46 connects between nodes 42 and 44. Zener diodes 48 and 50 do prevention w.r.t. overvoltage. Full-wave rectifier 40 of the prior art connects between lines 52 and 54 at nodes 56 and 58 and includes diodes D1, D2, D3, and D4. From node 62, the voltage $V_{DD}$ from prior art full-wave rectifier 40 appears. Capacitor $C_L$ filters a portion of the alternating current portion of full-wave rectifier 40 to ground.

Figure 3:
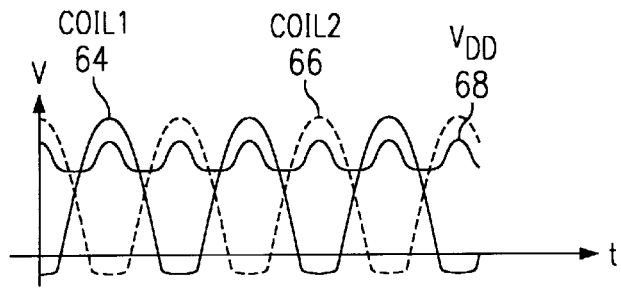
FIG. 3 shows the $V_{DD}$ output voltage curve for the prior art full-wave rectifier of FIG. 2.

FIG. 3 illustrates the results of using prior art full-wave rectifier 40 to produce transponder 14 working voltage VDD. As FIG. 3 clearly shows, the COIL 1 voltage at curve 64 and the COIL 2 voltage at curve 66 go to full-wave rectifier 40. The output voltage, $V_{DD}$, at curve 68 shows that less than all of the maximum COIL 1 and COIL 2 voltages appear as the maximum $V_{DD}$ voltages. The lower voltage results from the diode configuration of full-wave rectifier 40. The full-wave rectifier 40 output voltage $V_{DD}$ is lower than the maximum AC peak voltage at the input of full-wave rectifier 40 by as much as 0.7V to 1.5V. By replacing full-wave rectifier 40 with the full-wave rectifier of the present embodiment, the maximum available $V_{DD}$ voltage results. Because of the higher input voltage to the regulator that associates with the full-wave rectifier, the present embodiment yields a higher output regulator voltage. This provides improved far-distance recognition system operation with lower input voltage.

Figure 4:
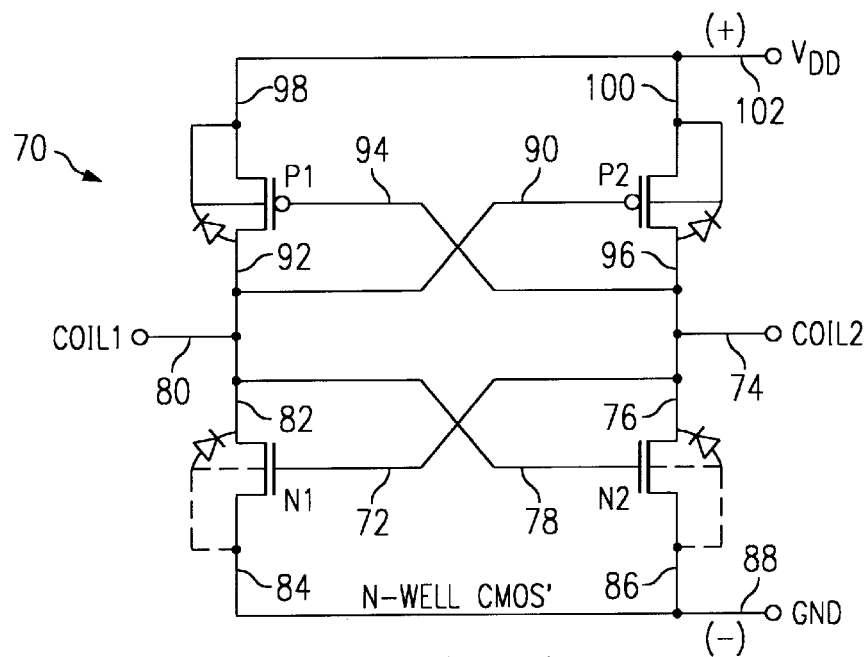
FIG. 4 illustrates the full-wave rectifier circuit of the present embodiment for use in a circuit similar to that of FIGS. 1a and 1b.

FIG. 4 shows one embodiment of rectifier circuit 70 of the present embodiment, which includes N-channel transistors N1 and N2 and P-channel transistors, P1 and P2. N-channel transistor N1 gate 72 connects to COIL 2 74 and to the source 76 of N-channel transistor N2. N-channel transistor N2 gate 78 connects to COIL 1 80 and source 82 of N-channel transistor N1. Drain 84 of N-channel transistor N1 and drain 86 of N-channel transistor N2 both connect to ground 88. COIL 1 80 also connects to gate 90 of P-channel transistor P2 and source 92 of P-channel transistor P1. COIL2 74 connects to gate 94 of P-channel transistor P1 and source 96 of P-channel transistor P2. Drain 98 of P-channel transistor P1 and drain 100 of P-channel transistor P2 both connect to $V_{DD}$ voltage source 102.

Figure 5:
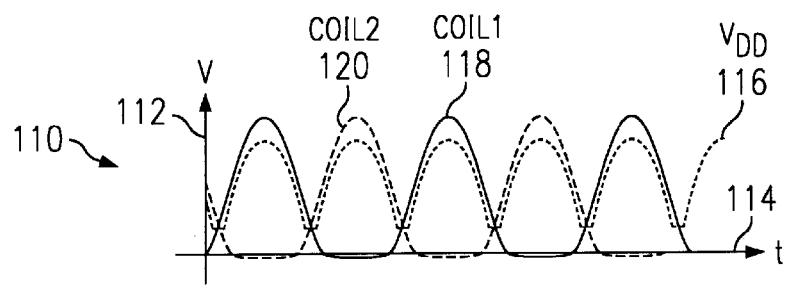
FIG. 5 illustrates the output voltage, $V_{DD}$, curve of rectifier circuit in the present embodiment.

FIG. 5 shows $V_{DD}$ voltage timing diagram 110 including vertical axis 112 for representing voltage values and horizontal axis 114 for representing time, t. Rectifier circuit 70 operates to produce the voltage that line 116 represents, which is the addition of positive voltage at COIL 1 80 and COIL 2 74. In other words, the voltage that line 116 represents results from the addition of the COIL 1 80 voltage that line 118 represents with the COIL 2 74 voltage that line 120 represents.

Rectifier circuit 70 provides the advantage of eliminating the voltage drop of $V_{DD}$ that exists in conventional rectifier circuits because N-channel transistors N1 and N2 minimize the voltage drop between ground and substrate, while P-channel transistors P1 and P2 minimize the voltage drop between the alternating current peak voltage for producing $V_{DD}$ and the rectifier output voltage, $V_{DD}$.

In operation, N-channel transistors N1 and N2 and P-channel transistors P1 and P2 switch on and off alternating in a manner similar to the operation of diodes of a rectifier bridge circuit. Alternating voltage from COIL 1 80 controls gate 78 of N-channel transistor N2 and gate 90 of P-channel transistor P2, while COIL 2 74 controls gate 74 of N-channel transistor N1 and gate 94 of P-channel transistor P1.

Rectifier circuit 70 includes P-channel transistors P1 and P2 to minimize the voltage drop between the alternating currents of COIL 1 80 and COIL 2 74. At very low input voltages, the inherent diodes of N-channel transistors N1 and N2 and P-channel transistors P1 and P2 control circuit rectifier circuit 70 operation until there is sufficient voltage to control their switching operation. This occurs because the junction diodes from drain 82 of N-channel transistor N1 and drain 76 of N-channel transistor N1 and drain 96 of P-channel transistor P2 and drain 92 of P-channel transistor P1, conduct in the same direction of the diodes that often appear in a conventional full-wave rectifier. In other words, for voltages in COIL 1 80 and COIL 2 74 that are below the switching voltage levels for the four transistors, the diodes are already working. Note that for P-channel CMOS components in rectifier circuit 70, the circuits are to be defined in a complementary way. In addition, the gates of N-channel transistor N1 and N2 and P-channel transistors P1 and P2 may also be controlled by a specifically applicable control logic, if desired.

Another attractive feature of the present embodiment is that it provides improved far-distance operation with lower input voltages relative to conventional rectifier circuits. This is because of the higher input voltage $V_{DD}$ that rectifier circuit 70 produces. The higher $V_{DD}$ voltage produces a higher output voltage to the associated regulator (see FIG. 7) connecting to rectifier circuit 70. There is a higher degree of fluctuation in $V_{DD}$ with the present embodiment. However, the associated regulator that receives $V_{DD}$ can effectively smooth out these voltage fluctuations.

Figure 6:
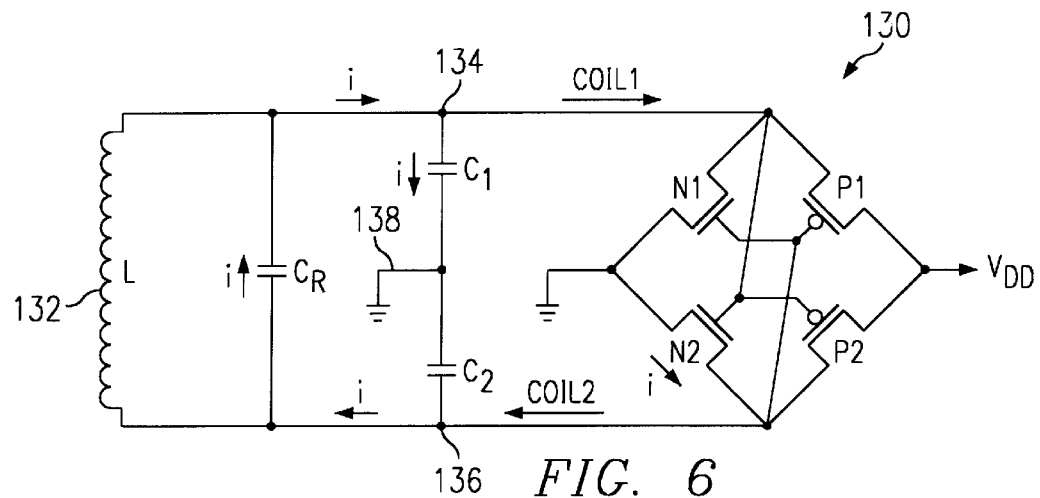
FIG. 6 depicts a capacitive trimming operation that the present embodiment makes possible.
Figure 7:
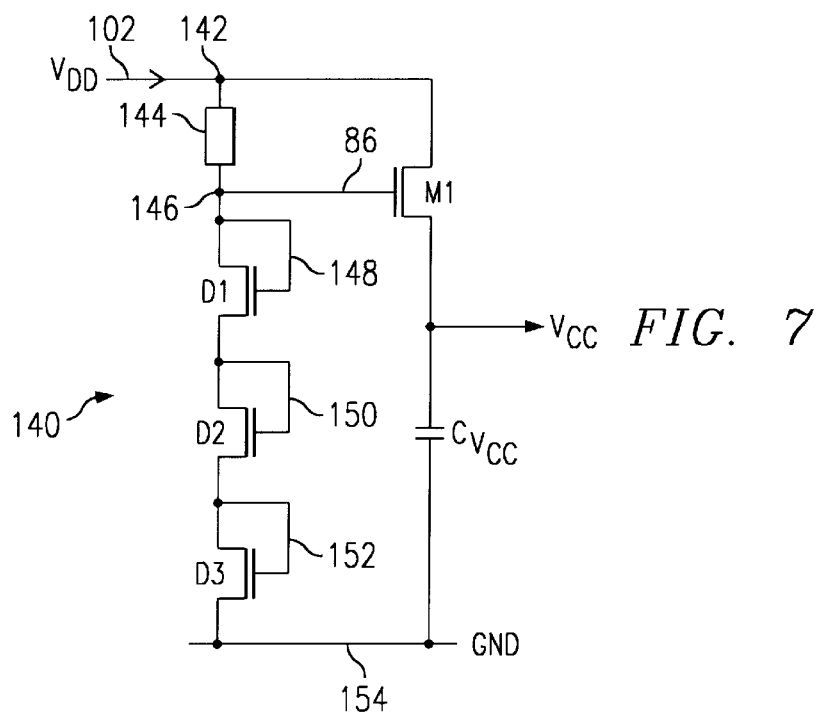
FIG. 7 illustrates one embodiment of a regulator circuit that may be used with the rectifier circuit of the present embodiment.

A consideration of implementing the present embodiment of the invention is that rectifier circuit 70 of FIG. 1 is that a capacitor trimming circuit may be combined with rectifier circuit 70. This is shown in FIG. 6 as a bridge circuit configuration 130 in which inductor 132 connects in parallel with capacitor CR and trimming capacitors $C_1$ and $C_2$, Node 134 connects to COIL 1 80, while node 136 connects to COIL 2 74. In operation, when the voltage of COIL 1 80 exceeds the voltage of COIL 2 74 current flows from trimming capacitor C1 to ground connection 138 to N-channel transistor N2 to CR and to C1. On the other hand, when the voltage of COIL 2 74 exceeds that of COIL 1 80 current flows trimming capacitor C2 to ground 138: to N-channel transistor N1 to CR and to trimming capacitor C2. Therefore, transistors N1 and N2 have to be sufficient large in order to avoid loss in quality for the trimming capacitors, diodes only are not sufficient FIG. 7 shows one embodiment of a regulator circuit 140 that may be used in connection with rectifier circuit 70. Regulator circuit 140 decouples the two p-channel switches from the capacitor. As a result, the switching is not influenced negatively by the capacitive load. In regulator circuit 140, $V_{DD}$ voltage 102 appears at node 142. Resistor 144 pass current to node 146 which defines the voltage for drain 148 of diode D1. the voltage at diode D1 determines the voltage level of the drain 152 of diode D3. Diode D3 conducts current that it passes to ground 154. Node 152 controls voltage to diode M1, while mode 156 holds the voltage to drain 166 of diode M1. Diode M1 determines the voltage level $V_{cc}$, which is the alternating current portion of which capacitor $C_{Vcc}$ shunts to ground 154. In other words, diode M1 stabilizes the value of $V_{cc}$ while in diodes D1, D2 and D3 define the reference voltage for diode M1. Diode M1 conducts only if $V_{DD}$ is sufficiently high.

Figure 8:
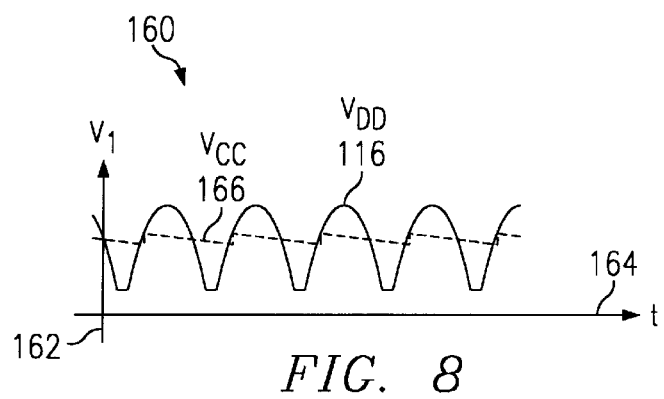
FIG. 8 illustrates the output voltage of the regulator circuit of FIG. 5.

FIG. 8 provides voltage diagram 160 and illustrates the effect of including with rectifier circuit 70 the inventive concepts of regulator circuit 140. Voltage diagram shows along vertical axis 162 voltage levels, $V_1$ and along horizontal axis 164 time, t. Voltage line 166 represent the $V_{DD}$ voltage level 102. Line 166 illustrates the $V_{cc}$ output voltage from regulator circuit 140.

Although the preferred embodiment has been described in detail, it should be understood that various changes, substitutions and alterations may be made herein without departing from the spirit and scope of the invention as defined in the dependent claims

What is claimed is:

1. An improved full-wave rectifier for a transponder, said transponder being formed on a one substrate and associated with a matching member which operates to control a control mechanism of a device; the matching member and other non-matching members containing facilities each of which, when receiving energy transmitted from a transmitter/receiver an antenna produce a respective unique recognition signal in the transponder; control of the device being possible only upon simultaneous occurrence of both operation of the control mechanism and production of a recognition signal by the matching member; wherein the improved full-wave rectifier comprises:

a first transistor and a second transistor in combination forming a first transistor pair for minimizing voltage drop between ground and the transponder substrate;

a third transistor and a fourth transistor in combination forming a second transistor pair for minimizing the voltage drop between the alternating current peak voltage and the output voltage of said full-wave rectifier;

said first transistor pair and said second transistor pair being controlled by alternating current voltage input signals to produce a full-wave rectified alternating current voltage output; and a regulator circuit for decoupling said first transistor pair and said second transistor pair from capacitive loads of said full-duplex transponder.

2. An improved full-wave rectifier as in claim 1, wherein said first transistor pair comprises a first N-channel transistor and a second N-channel transistor.

3. An improved full-wave rectifier as in claim 1, wherein said second transistor pair comprises a first P-channel transistor and a second P-channel transistor.

4. An improved full-wave rectifier as in claim 1, wherein said regulator comprises a series regulator for producing a direct current output voltage in response to said full-wave rectified alternating current voltage.

5. An improved full-wave rectifier as in claim 1, wherein transponder circuit further comprises a trimming capacitor circuit for performing capacitive trimming of said connected resonant circuit.

6. An improved full-wave rectifier as in claim 1, wherein said first transistor pair comprises a first N-channel CMOS transistor and a second N-channel CMOS transistor.

7. An improved full-wave rectifier as in claim 1, wherein said first transistor pair and said second transistor pair each comprises inherent diode junctions for controlling transponder circuit operation until said alternating current voltage reaches predetermined minimum level.

8. An improved full-wave rectifier for a transponder associated with a matching key which is operable by insertion into to control a device; the matching key containing the facilities such that, when receiving energy radiated by a transmitter/receiver via an antenna, the key is in the vicinity of a lock of a device, the key produces a unique recognition signal to the transmitter/receiver; control of the device being possible only upon simultaneous occurrence of both operation of the lock and production of a recognition signal by the key; wherein the improvement comprises:

a first transistor and a second transistor in combination forming a first transistor pair for minimizing voltage drop between ground and the transponder substrate;

a third transistor and a fourth transistor in combination forming a second transistor pair for minimizing the voltage drop between the alternating current peak voltage and the output voltage of said full-wave rectifier;

said first transistor pair and said second transistor pair being controlled by alternating current voltage input signals to produce a full-wave rectified current voltage output alternating; and a regulator for circuit decoupling said first transistor pair and said second transistor pair from compacitive loads of said full-duplex transponder.

* * * * *

UNITED STATES PATENT AND TRADEMARK OFFICE
CERTIFICATE OF CORRECTION

PATENT NO : 5,870,031
DATED : Feb. 9, 1999
INVENTOR(S): Ulrich Kaiser; Harald Parzhuber, both of Germany It is certified that error appears in the above-identified patent and that said Letters Patent is hereby corrected as shown below:

On the title page, item[60], please add "Provisional application No. 60/011,143 Jan. 31, 1996" it was omitted and is not the error of the applicant.

Signed and Sealed this

Eighth Day of June, 1999

Attest:

Q. TODD DICKINSON

Attesting Officer

Acting Commissioner of Patents and Trademarks